United States Patent
Seibold

(10) Patent No.: US 6,601,900 B1
(45) Date of Patent: Aug. 5, 2003

(54) SEAT ASSEMBLY

(75) Inventor: Kurt A. Seibold, South Lyon, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/889,280

(22) PCT Filed: Jan. 15, 2000

(86) PCT No.: PCT/US00/01064

§ 371 (c)(1),
(2), (4) Date: Dec. 6, 2001

(87) PCT Pub. No.: WO00/41910

PCT Pub. Date: Jul. 20, 2000

Related U.S. Application Data

(60) Provisional application No. 60/116,018, filed on Jan. 15, 1999.

(51) Int. Cl.⁷ .................................................. B60N 2/10
(52) U.S. Cl. ............................... 296/65.09; 296/65.05; 297/334
(58) Field of Search ........................... 296/65.05, 65.09; 297/331, 334, 335

(56) References Cited

U.S. PATENT DOCUMENTS

| | | | |
|---|---|---|---|
| 3,727,976 A | 4/1973 | Lystad | 297/340 |
| 4,957,321 A | * 9/1990 | Martin et al. | 296/65.09 |
| 5,397,167 A | 3/1995 | Fourrey et al. | 297/354.13 |
| 5,454,624 A | 10/1995 | Anglade et al. | 297/354.13 |
| 6,000,742 A | * 12/1999 | Schaefer et al. | 296/65.09 |
| 6,334,643 B1 | * 1/2002 | Lindblad et al. | 296/65.09 |

FOREIGN PATENT DOCUMENTS

| | | |
|---|---|---|
| DE | 19607060 C1 | 4/1997 |
| EP | 0229625 | 7/1987 |
| EP | 0738624 B1 | 10/1996 |

* cited by examiner

Primary Examiner—Dennis H. Pedder

(57) ABSTRACT

A seat assembly (10) for a vehicle with a seat cushion (12), a seat back (14) connected to the seat cushion, a front link (22) having an upper end and a lower end, and a rear link (24) having an upper end and a lower end. The upper end of the front link is connected to the seat cushion for pivotal movement about a first axis (32), while the lower end of the front link is connected to the vehicle for pivotal movement about a second axis (50). The front link is further connected to either the seat cushion or the vehicle for sliding movement from a first position to a second position. The upper end of the rear link is connected to the seat cushion for pivotal movement about a third axis (34), while the lower end of the rear link is connected to the vehicle for pivotal movement about a fourth axis (30). The seat assembly may be transitioned from a first use position to a second use position by pivoting the seat cushion about the second axis and the fourth axis. The seat assembly may also be transitioned from the first use position to a stowed position by sliding the front link from the first position to the second position and by rotating the seat cushion about the third axis.

17 Claims, 6 Drawing Sheets

SEAT ASSEMBLY

This Application claims the benefit of No. 60/116,018 filed Jan. 15, 1999.

BACKGROUND AND SUMMARY OF THE INVENTION

The present invention relates to a folding vehicle seat and in particular to a seat which can be folded to a stowed position and also to an upwardly and forwardly raised table position in which the seat back forms a table for use by adjacent seat occupants.

Vehicle manufacturers are continually striving to provide improved convenience features in motor vehicles. The folding seat of the present invention continues in this trend by providing a seat for a second or third seating row in a sport utility vehicle or other vehicle. The seat is foldable to a stowed position in which the seat back forms a load platform for carrying cargo thereon. In addition, the seat can be folded to a table position in which the seat back forms a generally horizontal table surface that can be used by occupants seated to either side of the folding seat. As such, the folding seat of the present invention is primarily intended for use in the center portion of a bench seat or as a center seat in a row of seats. The folding seat of the present invention can; however, be used in other locations in the vehicle if desired.

Briefly, the invention includes a seat assembly for a vehicle with a seat cushion, a seat back connected to the seat cushion, a front link having an upper end and a lower end, and a rear link having an upper end and a lower end. The upper end of the front link is connected to the seat cushion for pivotal movement about a first axis, while the lower end of the front link is connected to the vehicle for pivotal movement about a second axis. The front link is further connected to either the seat cushion or the vehicle for sliding movement from a first position to a second position. The upper end of the rear link is connected to the seat cushion for pivotal movement about a third axis, while the lower end of the rear link is connected to the vehicle for pivotal movement about a fourth axis. The seat assembly may be transitioned from a first use position to a second use position by pivoting the seat cushion about the second axis and the fourth axis. The seat assembly may also be transitioned from the first use position to a stowed position by sliding the front link from the first position to the second position and by rotating the seat cushion about the third axis.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENTS

The following description of the preferred embodiment is merely exemplary in nature, and is in no way intended to limit the invention or its application or uses.

Figure 1:
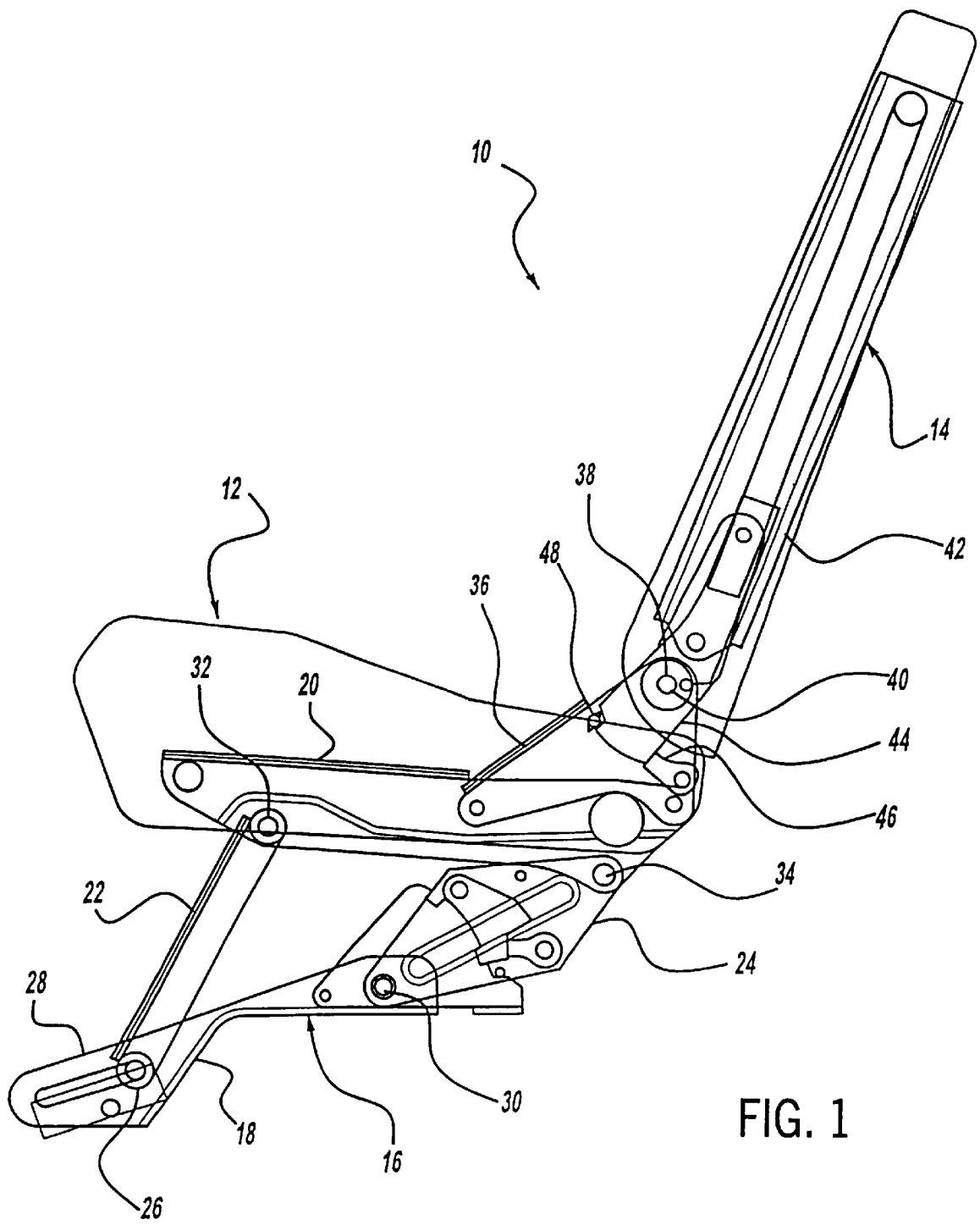
FIG. 1 is a side view of the folding seat according to a first embodiment of the present invention, shown in a passenger use position.
Figure 2:
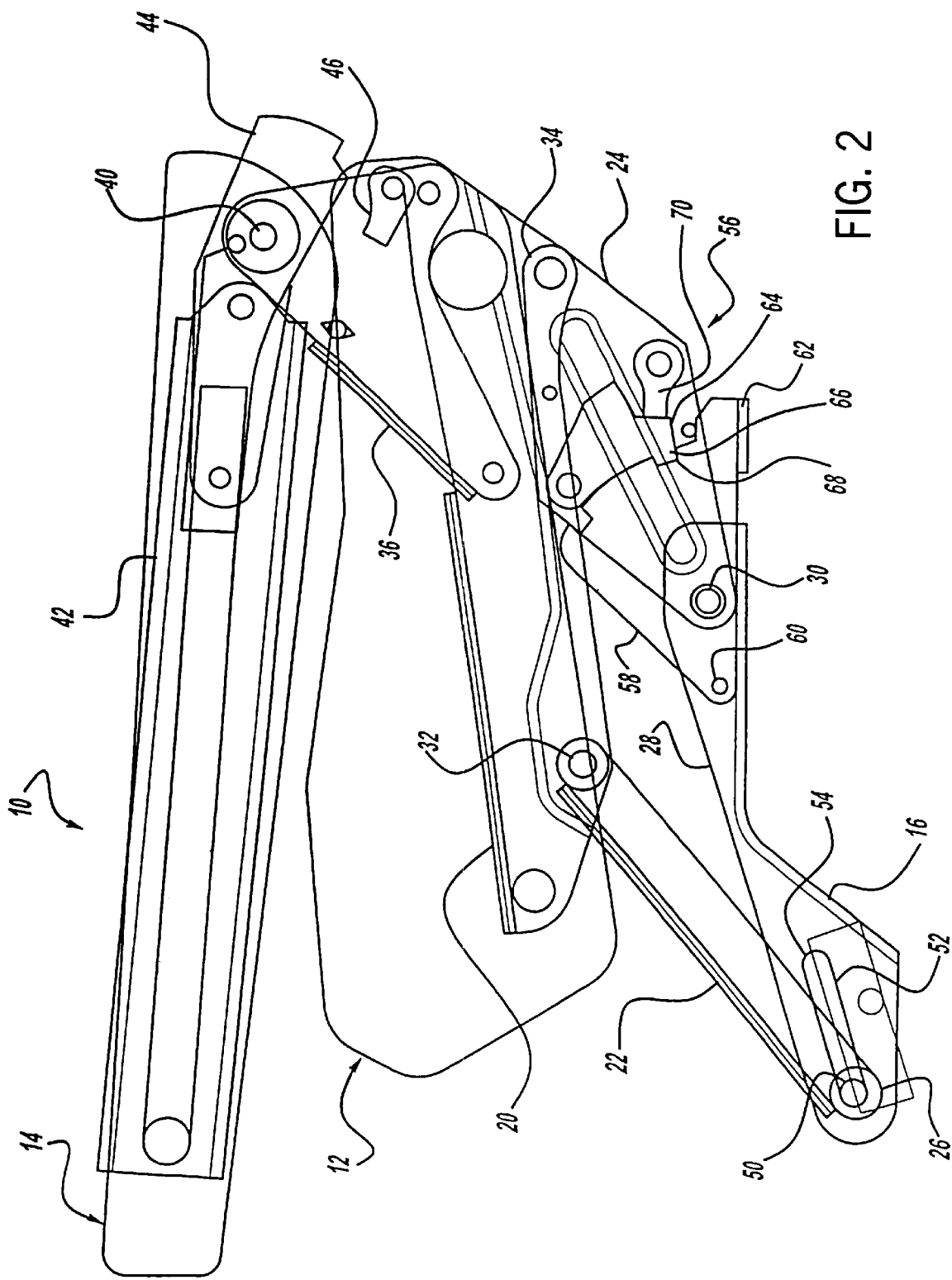
FIG. 2 is a side view of the folding seat of FIG. 1, shown in a stowed position.
Figure 3:
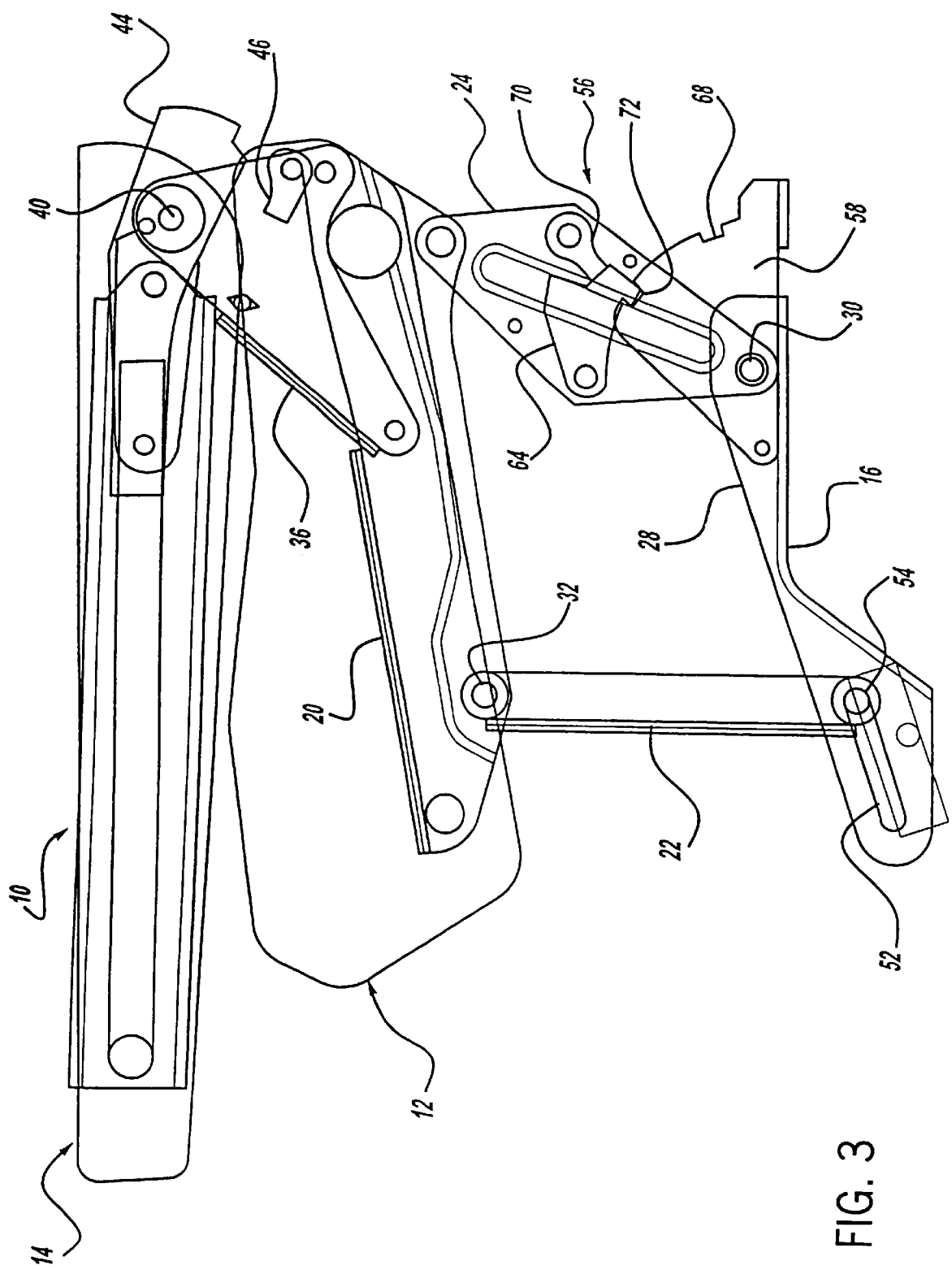
FIG. 3 is a side view of the folding seat of FIG. 1, shown in a table position.

The folding seat according to the first preferred embodiment of the present invention is shown in FIGS. 1–3 and designated generally at 10. The folding seat 10 is shown in FIG. 1 in a passenger use position. The folding seat 10 includes a generally horizontal seat cushion 12 and a seat back 14 which extends upwardly at the rear of the seat cushion 12. The folding seat 10 is shown mounted in a motor vehicle and attached to the vehicle floor 16.

The seat cushion 12 includes a seat cushion frame 20 to which front and rear links 22, 24 are attached to mount the folding seat 10 to the vehicle floor 16. The lower end 26 of the front link 22 is coupled to a mounting bracket 28 which is secured to the vehicle floor 16 by welds, bolts, rivets, etc. in a known manner. The rear link 24 is rotatably coupled to the mounting bracket 28 by a pivot 30. The front link 22 is pivotally connected to the seat cushion frame 20 by a pivot 32 while the upper end of the rear link 24 is coupled to the seat cushion frame 20 by a pivot 34.

A riser 36 is fixed to the seat cushion frame 20 and extends upwardly therefrom. The riser 36 defines a pivot aperture 38 which receives a seat back pivot 40 about which the seat back 14 rotates relative to the seat cushion 12. The seat back 14 includes a seat back frame 42 having a downwardly extending pivot arm 44, somewhat similar in construction to a seat back recliner sector. The pivot arm 44 extends downwardly below the seat back pivot 40 and is fixed against rotation by a locking cam 46 and a stop stud 48. The seat back 14 is released from the upright position by rotation of the locking cam 46, freeing the pivot arm 44 to rotate counterclockwise about the axis of the seat back pivot 40. The seat back 14 rotates to a generally horizontal position overlying the seat cushion 12 as shown in FIGS. 2 and 3.

With reference to FIG. 2, the folding seat 10 is shown in the stowed position. The folding seat 10 is moved to the stowed position by rotating the seat back 14 to a lowered position as described above. In addition, the front end of the seat cushion is lowered to enable the seat back 14 to reach a more horizontal orientation. The lower end 26 of the front link 22 has a pivot 50 which is slidable within a slot 52 in the mounting bracket 28. A locking cam (not shown) similar to the locking cam 46, is provided at the slot 52 to hold the pivot 50 at the upper rear end 54 of the slot 52. The pivot 50 is released to slide downward and foreword through the slot 52, allowing the seat cushion 12 to rotate about the pivot 34 at the rear link 24. This lowers the front of the seat cushion 12. Folding of the seat to the stowed position is accomplished without rotation of the rear link 24 about the pivot 30.

The rear link 24 is held in place about the pivot 30 by a locking mechanism 56. The locking mechanism 56 includes a locking plate 58 which is attached to the mounting bracket 28 by a fastener 60 and is attached to the vehicle floor 16 at the foot 62. A pawl 64 is mounted to the rear link 24 and includes a tooth 66. The tooth 66 is seated into a detent 68 in the locking plate 58, to hold the rear link 24 in a fixed position about the pivot 30. A locking cam 70 mounted to the rear link holds the pawl 64 in firm engagement with the detent 68.

The locking mechanism 56 is releasable to enable the rear link 24 to rotate about the pivot 30 to the table use position of the folding seat 10 shown in FIG. 3. In the table use position, the rear link 24 is locked in place about the pivot 30 by the locking mechanism 56 with the pawl tooth seated into a second detent 72 in the locking plate 58. In the table use position, the lower end of the front link 22 remains at the rear, upper end 54 of the slot 52. The front link rotates counterclockwise to the table use position to raise the front end of the seat cushion 12 and move the seat cushion 12 forward. The rear link 24 raises the rear end of the seat cushion to enable the seat back 14 to be disposed at an approximately horizontal orientation whereby the rear surface of the seat back can function as a table for passengers seated on either side of the folding seat 10.

The folding seat 10 typically includes a pair of front links 22 and a pair of rear links 24 with one pair of front and rear links disposed on each side of the folding seat 10. While the folding seat 10 is shown mounted to a vehicle floor 16 containing a waterfall region, the folding seat 10 is not limited to such a location in the vehicle. The folding seat 10 can be located on a flat vehicle floor with equal results by appropriate modifications to the mounting bracket 28 and/or the front and rear links 20, 24.

Figure 4:
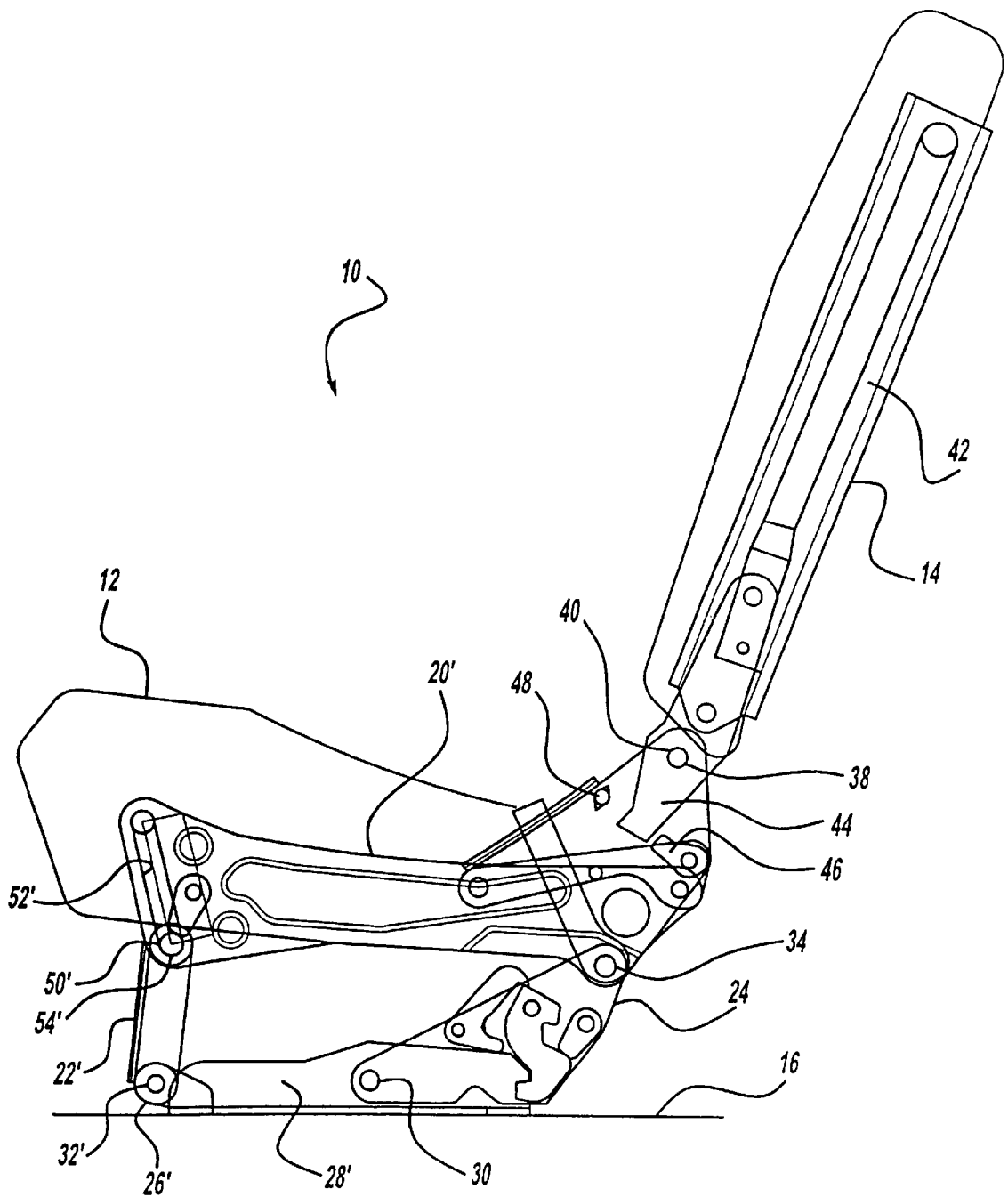
FIG. 4 is a side view of the folding seat according to a second embodiment of the present invention, shown in a passenger use position.
Figure 5:
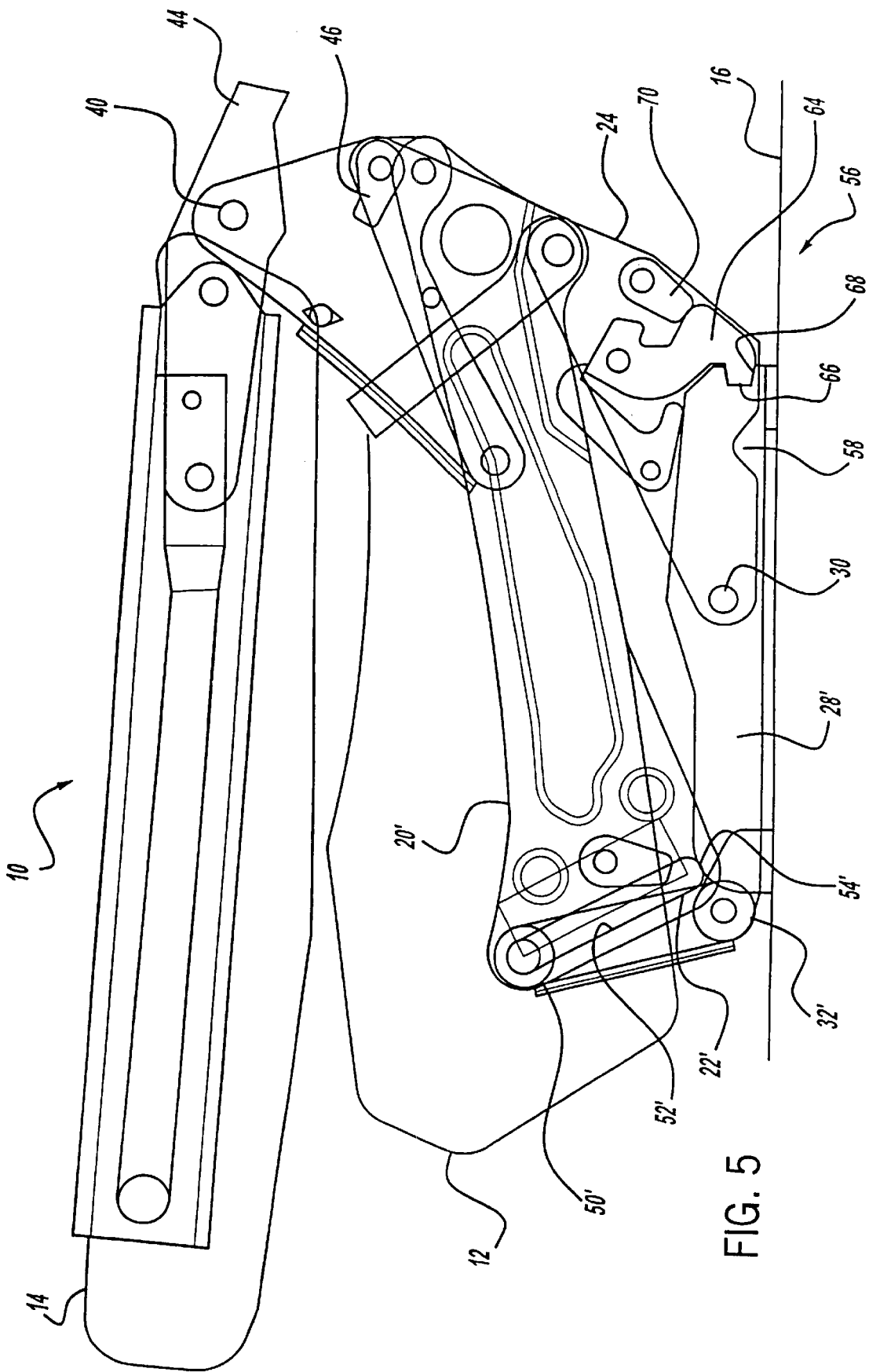
FIG. 5 is a side view of the folding seat of FIG. 4, shown in a stowed use position.
Figure 6:
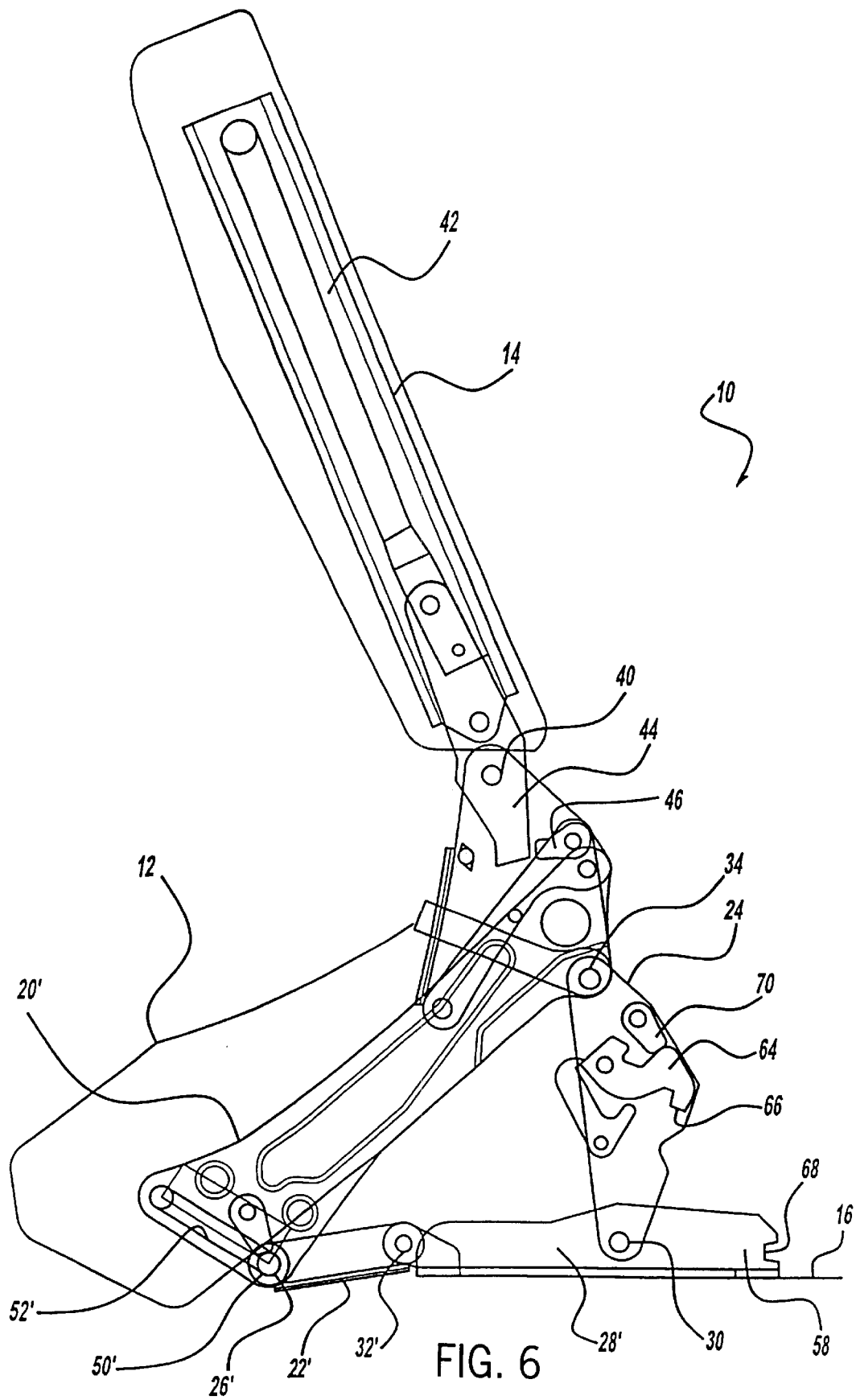
FIG. 6 is a side view of the folding seat of FIG. 4, shown in a tumbled use position.

The folding seat according to the second preferred embodiment of the present invention is shown in FIGS. 4–6 and designated generally at 10'. The folding seat 10' of the second embodiment is similar to and shares many components with the folding seat 10 of the first embodiment. For this reason, the folding seat 10' is shown in FIGS. 4–6 with many components designated with the exact reference numbers as the components of FIGS. 1–3. These components, although not exactly the same, perform the same function in both embodiments. The other components, designated with the exact reference numbers and a prime ('), perform a similar function, but with important differences, which will be fully explained below.

The folding seat 10' of the second embodiment differs from the folding seat 10 because of the location of the slot 52' on the seat cushion frame 20'. The lower end 26' of the front link 22' is pivotally connected to the mounting bracket 28' by a pivot 32', while the upper end of the front link 22' is slidably connected within the slot 52' of the seat cushion frame 20' at a pivot 50'. The pivot 50' is released to slide upward and forward through the slot 52', allowing the seat cushion 12 to rotate about the pivot 34 at the rear link 24. This lowers the front of the seat cushion 12. Folding of the folding seat 10' to the stowed position is accomplished without rotation of the rear link 34 about the pivot 30.

The locking mechanism 56 is releasable to enable the rear link 24 to rotate about the pivot 30 to a tumbled use position of the folding seat 10', as shown in FIG. 6. In the tumbled use position, the upper end of the front link 22' remains at the rear, lower end 54' of the slot 52'. The rear link 24 raises the rear end of the seat cushion 20 to enable the seat back 14 to be disposed in a forward direction whereby allowing ingress and egress past the folding seat 10'.

The folding seat 10' also differs from the folding seat 10 because of the modification of the mounting plate 28' to incorporate a tooth 66. This modification allows for the deletion of the locking plate 58, which provides for a cleaner looking folding seat 10' when pivoted into the tumbled use position.

As can be readily understood by a person of ordinary skill in the art, the folding seat 10 of the first preferred embodiment and the folding seat 10' of the second preferred embodiment are, for the most part, interchangeable at the discretion of the manufacturer.

It is to be understood that the invention is not limited to the exact construction illustrated and described above, but that various changes may be made if not thereby departing from the scope of the invention as defined in the following claims.

I claim:
1. A seat assembly for a vehicle, comprising:
   a seat cushion;
   a seat back connected to said seat cushion;
   a front link having an upper end connected to said seat cushion for pivotal movement about a first axis, and a lower end connected to the vehicle for pivotal movement about a second axis, said front link being further connected to one of said seat cushion and the vehicle for sliding movement from a first position to a second position; and
   a rear link having an upper end connected to said seat cushion for pivotal movement about a third axis, and a lower end connectable to the vehicle for pivotal movement about a fourth axis;
   such that said seat assembly may be transitioned from a first use position to a second use position by pivoting said seat cushion about said second axis and said fourth axis, and to a stowed position by sliding said front link from the first position to the second position and by rotating said seat cushion about said third axis.

2. The seat assembly of claim 1 wherein said first axis is displaced in a downward direction during the transition of said seat assembly from the first use position to the stowed position.

3. The seat assembly of claim 1 wherein said third axis remains stationary during the transition of said seat assembly from the first use position to the stowed position.

4. The seat assembly of claim 1 wherein said first axis and said third axis are displaced in a forward direction during the transition of said seat assembly from the first use position to the second use position.

5. The seat assembly of claim 1 wherein said front link is connected to the vehicle for sliding movement, and wherein said seat back is connected to said seat cushion for pivotal movement from an upright position to a generally horizontal position such that said seat back forms a table surface in the second use position.

6. The seat assembly of claim 5 wherein said first axis and said third axis are also displaced in an upward direction during the transition of said seat assembly from the first use position to the second use position.

7. The seat assembly of claim 5 wherein said second axis is displaced in a forward direction relative to the vehicle during the transition of said seat assembly from the first use position to the stowed position.

8. The seat assembly of claim 7 wherein said second axis is also displaced in a downward direction relative to the vehicle during the transition of said seat assembly from the first use position to the stowed position.

9. The seat assembly of claim 1 wherein said front link is connected to said seat cushion for sliding movement, and wherein said seat back moves into a tumbled position in said second use position to allow ingress and egress past said seat assembly.

10. The seat assembly of claim 9 wherein said first axis is also displaced in a downward direction and said third axis is also displaced in an upward direction during the transition of said seat assembly from the first use position to the second use position.

11. The seat assembly of claim 9 wherein said first axis is displaced in an upward direction relative to said seat cushion during the transition of said seat assembly from the first use position to the second use position.

12. The seat assembly of claim 11 wherein said first axis is also displaced in a forward direction relative to said seat cushion during the transition of said seat assembly from the first use position to the second use position.

13. The seat assembly of claim 1 further comprising a mounting bracket fastenable to the vehicle, wherein said lower end of said front link is connected to said mounting bracket for pivotal movement, and said lower end of said rear link is connected to said mounting bracket for pivotal movement.

14. The seat assembly of claim 13 wherein said front link is further connected to said mounting bracket for sliding movement.

15. The seat assembly of claim 14 wherein said mounting bracket defines a slot, said lower end of said front link includes a pin, and said pin of said front link is connected to said slot of said mounting bracket for sliding movement.

16. The seat assembly of claim 13 wherein said front link is connected to said seat cushion for sliding movement.

17. The seat assembly of claim 16 wherein said seat cushion defines a slot, said upper end of said front link includes a pin, and said pin of said front link is connected to said slot of said seat cushion for sliding movement.

* * * * *